United States Patent [19]

Howard

[11] Patent Number: 4,831,889

[45] Date of Patent: May 23, 1989

[54] CONICAL WORM GEAR FOR A MULTI-SPEED BICYCLE DRIVE MECHANISM

[75] Inventor: Edward Howard, Westmount, Canada

[73] Assignee: Wheled Holdings Inc., Montreal, Canada

[21] Appl. No.: 194,972

[22] Filed: May 17, 1988

[51] Int. Cl.⁴ ............................................. F16H 55/22
[52] U.S. Cl. .................................... 74/425.5; 74/348; 280/260
[58] Field of Search ...................... 74/348, 425, 425.5; 280/259, 260

[56] References Cited

U.S. PATENT DOCUMENTS

| | | | |
|---|---|---|---|
| 1,206,043 | 11/1916 | Slonecker | 74/348 |
| 1,302,821 | 5/1919 | McNeel | 74/348 |
| 2,378,634 | 6/1945 | Hussey | 280/260 |
| 3,074,741 | 1/1963 | Rutkove | 74/348 |
| 3,422,702 | 1/1969 | Novinger | 74/425.5 |
| 3,863,503 | 2/1975 | Loeb et al. | 280/238 X |
| 4,005,611 | 2/1977 | Jeffries | 280/236 X |
| 4,447,068 | 5/1984 | Brooks | 280/260 |

FOREIGN PATENT DOCUMENTS

152332 2/1903 Fed. Rep. of Germany ...... 280/259
3319178 2/1985 Fed. Rep. of Germany ........ 74/348

Primary Examiner—Leslie A. Braun
Assistant Examiner—Janice E. Chartoff
Attorney, Agent, or Firm—Samuel Meerkreebs

[57] ABSTRACT

A multi-speed chainless drive mechanism for a cycle-type vehicle comprises a drive shaft rotatably driven by a pedal actuated gear train. The drive shaft, which includes a universal joint, extends away from the gear train. The drive mechanism also comprises a first support provided intermediate the gear train and the universal joint for rotatably supporting the drive shaft to a frame of the vehicle. An elongated shaft extends from the universal joint opposite the gear train. A variable ratio worm gear, more particularly a cone-shaped worm gear, has an opening defined centrally and longitudinally therethrough. The worm gear is slidably mounted on the elongated shaft and is adapted for rotation therewith. The worm gear meshes with a drive gear mounted to a drive wheel of the vehicle. Different gear ratios are thus provided in relation to the longitudinal position of the worm gear on the elongated shaft. The drive mechanism also comprises a gear shifting device for moving the worm gear along the elongated shaft and for constantly maintaining the worm gear and the drive gear in a mesh.

19 Claims, 8 Drawing Sheets

CONICAL WORM GEAR FOR A MULTI-SPEED BICYCLE DRIVE MECHANISM

BACKGROUND OF INVENTION

1. Field of the Invention

This invention relates to bicycle-type drive mechanisms and, more particularly, to a multi-speed, chainless drive mechanism using a variable ratio worm gear for producing different gear ratios.

2. Description of Prior Art

Most multi-speed bicycles presently use the commonly known derailleur gear chain drive mechanism, which comprises a plurality of various sized sprockets mounted to the axle of the drive wheel, normally the rear wheel, and a shifting mechanism for moving the chain from one sprocket to another and, thus, from one gear ratio to another. The drive mechanism also comprises a spring actuated device to maintain a proper tension in the chain.

Chainless transmissions have been developed to produce drive mechanisms which are less costly, simpler and less subject to maintenance problems than the above derailleur systems. Such drive mechanisms are shown in U.S. Pat. Nos. 2,378,634, 3,863,503 and 4,005,611, which all substantially disclose a drive shaft, instead of a chain, adapted for linking gear where arrangements mounted to the pedal and drive wheel axles. The drive shaft has a gear mounted at least at one end thereof, which can longitudinally move on the shaft so as to engage with one of a number of concentric rings of gear teeth included on the gear wheel associated with that end of the shaft. The different rings provide different discrete gearing ratios.

The above patents all describe drive mechanism offering various discrete gearing ratios, whereby gear shifting is substantially rough and the effort developed by the rider instantly varies considerably when moving from one gear ratio to another.

SUMMARY OF INVENTION

It is therefore an aim of the present invention to provide a multi-speed chainless drive mechanism for a bicycle-type vehicle comprising a variable ratio worm gear for producing various gearing ratios.

It is a further aim of the present invention to provide a worm gear having a conical shape.

It is still a further aim of the present invention to provide worm gear shifting means for changing the gear ratio of the drive mechanism.

A construction in accordance with the present invention comprises a multi-speed drive mechanism for a cycle type vehicle comprising a worm gear support means that is rotatably supported by a frame of the vehicle. The worm gear support means transmits a rotational motion of a pedal means to a variable ratio worm gear means which is mounted on the worm gear support means and adapted to rotate therewith. The variable ratio worm gear meshes with a gear means which is mounted to a drive wheel of the vehicle. A gear shifting means is provided for longitudinally moving the worm gear means along the worm gear support means and for maintaining the worm gear means and the gear means a meshing engagement, whereby different gear ratios are provided.

In a more specific embodiment, the present invention comprises a multi-speed drive mechanism for a cycle-type vehicle comprising a drive shaft rotatably driven by a pedal actuated gear means. The drive shaft, which extends away from the gear means, also includes a universal joint means. The drive mechanism also comprises a first support means provided intermediate the gear means and the universal joint means for rotatably supporting the drive shaft to a frame of the vehicle. An elongated shaft extends from the universal joint means opposite the gear means. A variable ratio worm gear means, having n opening defined centrally and longitudinally therethrough, is slidably mounted on the elongated shaft and adapted for rotation therewith. The worm gear means meshes with a drive gear means mounted to a drive wheel of the vehicle. Different gear ratios are thus provided in relation to the longitudinal position of the worm gear means on the elongated shaft. The drive mechanism also includes a gear shifting means for moving the worm gear means along the elongated shaft and for maintaining the worm gear means in a meshed relationship with the drive gear means.

A further aspect of the present invention comprises a worm gear means having a conical shape.

A still further aspect of the present invention comprises the opening in the worm gear means and the elongated shaft associated therewith which have one of a square shape and a hexagon shape.

BRIEF DESCRIPTION OF DRAWINGS

Having thus generally described the nature of the invention, reference will now be made to the accompanying drawings, showing by way of illustration a preferred embodiment thereof, and in which.

DESCRIPTION OF PREFERRED EMBODIMENTS

Figure 1:
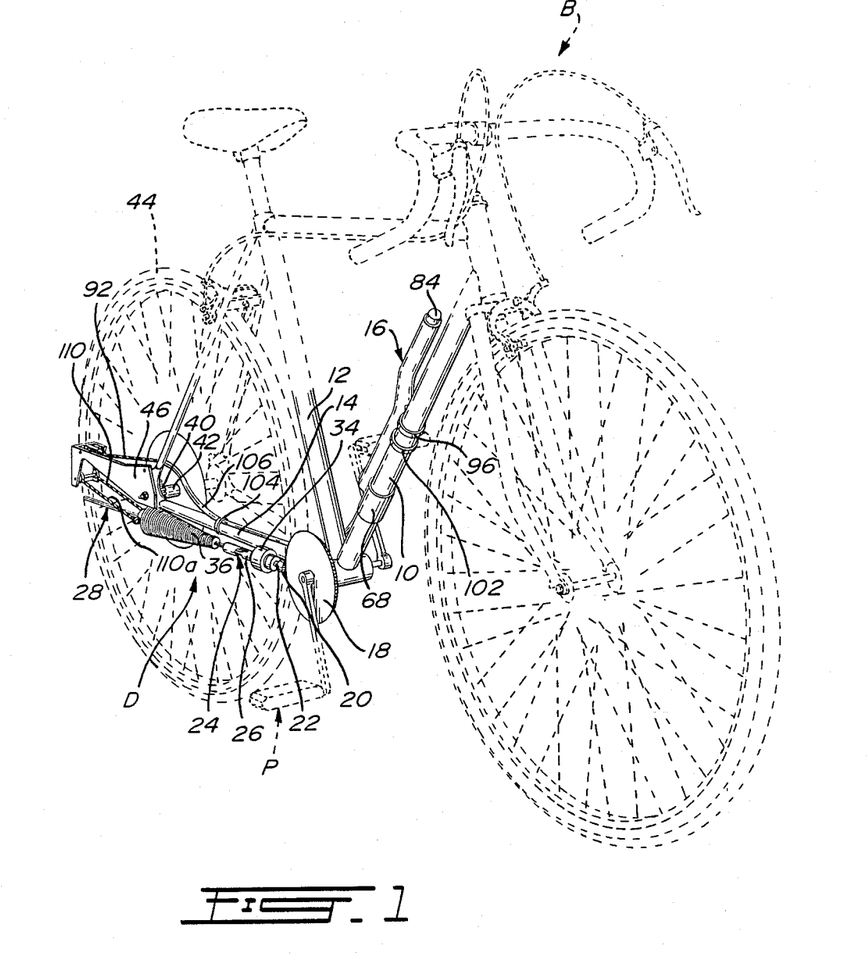
FIG. 1 is a perspective view of a bicycle, wherein the drive mechanism thereof, shown on full in full lines, is characterized by comprising a variable ratio worm gear.

A bicycle B including a drive mechanism D, is generally illustrated in FIG. 1. The bicycle B comprises regular tubular frame members 10, 12 and 14. The frame member 10 supports a shifting lever 16 which will be described in detail hereinafter. The drive mechanism D comprises first and second bevel gears 18 and 20 respectively. The second bevel gear 20 is fixedly mounted to a first end of a first drive shaft 22. A universal joint 24 is fixedly mounted at a first 26 thereof to a second end of the first drive shaft 22. A second drive shaft 28, having a hexagonal cross-sectional shape, is fixedly mounted at an end 30 thereof to a second end 32 of the universal joint 24 and extends away therefrom. The first drive shaft 22 is supported to the frame member 14 by way of a bearing housing 34 comprising bearings which are not shown.

A conical worm gear 36 has a hexagonally shaped opening 38 defined centrally and longitudinally therethrough for slidably mounting the worm gear 36 on the second drive shaft 28 in order that the worm gear 36 can rotate therewith. The worm gear 36 meshes with a drive gear wheel 40 which is mounted in standard ratchet-like fashion to an axle 42 of a rear drive wheel 44 of the bicycle B.

A guide arm 46, fixedly mounted to a frame part 480 of the bicycle B, and parts associate therewith to be described hereinbelow are provided for supporting the worm gear 36 and the elongated second drive shaft 28 and for guiding the worm gear 36 therealong while maintaining the drive gear wheel 40 and the worm gear 36 in a mesh. For doing so, the guide arm 46 comprises an elongated tubular guide rail 50 having a rectangular cross-section. A slot 52 is longitudinally defined on each elongated vertical side of the guide rail 50, whereas a further elongated slot 54 is defined on the bottom side thereof. One of the slots 52 is shown in dotted lines in FIG. 2, whereas the slot 54 is shown in dotted lines in FIG. 3.

Figure 4:
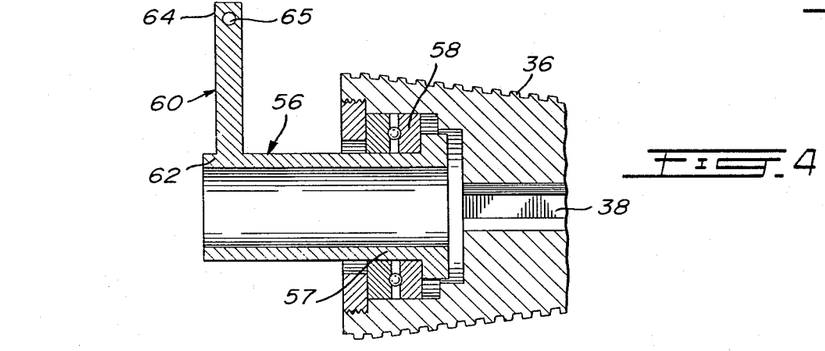
FIG. 4 is a cross-sectional side view of part of the worm gear and an end support and guide means therefor.

A thrust sleeve 56 is mounted near one end thereof to the larger end of the worm gear 36 by way of a thrust bearing 58, as best seen in FIG. 4, whereby the worm gear 36 can rotate freely around the thrust sleeve 56. An elongated member 60 extends upwardly from a further end 62 of the thrust sleeve 56. The elongated member 60 comprises near an end 64 thereof an opening 65 adapted to receive a guide pin 66 transversely mounted therethrough. The elongated member 60 is adapted for slidably fitting within the bottom slot 54 defined on the bottom wall of the guide rail 50, whereas the guide pin 66 is adapted for slidably fitting within both the side slots 52.

Figure 5:
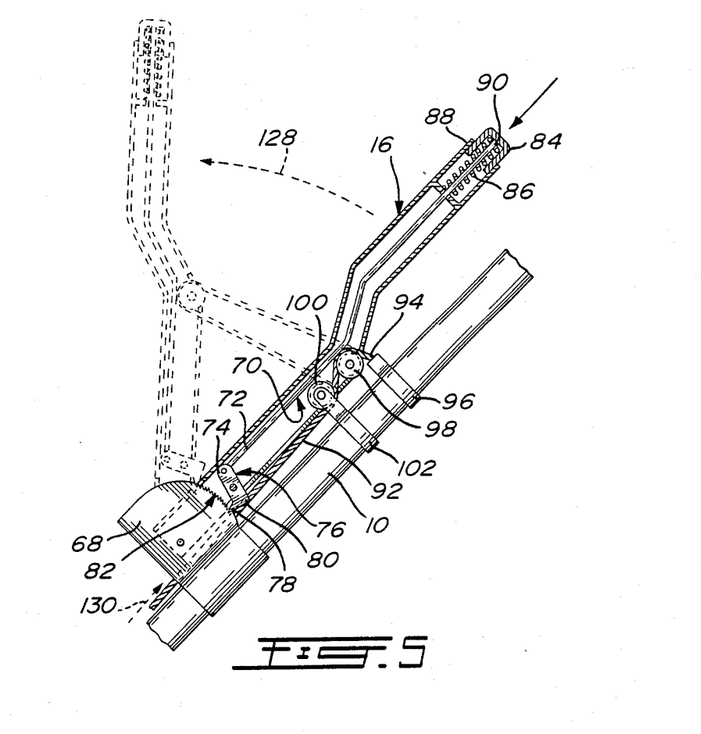
FIG. 5 is a side view partly in cross-section showing the shifting lever in one extreme position thereof, whereas the other extreme position thereof is shown in dotted lines.
Figure 6:
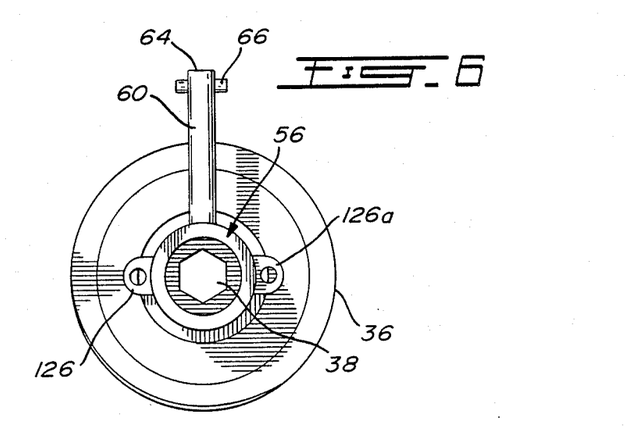
FIG. 6 is a rear elevation of the worm gear and the end support and guide means therefor.
Figure 7:
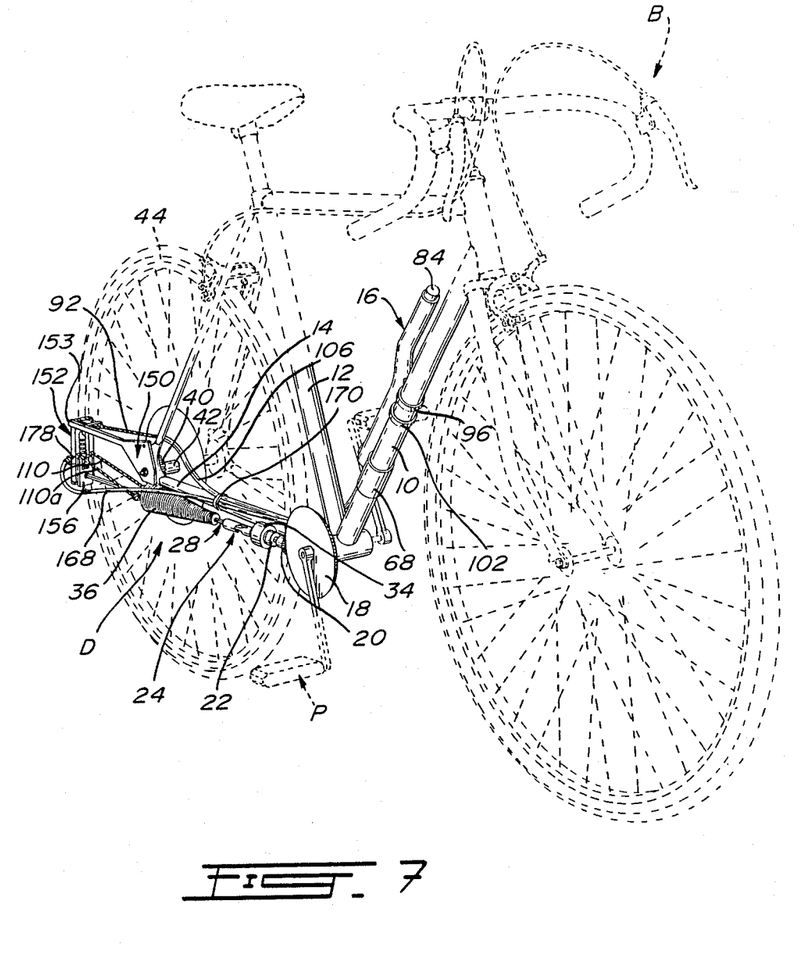
FIG. 7 is a perspective view similar to FIG. 1 showing a second embodiment of the present invention.
Figure 8:
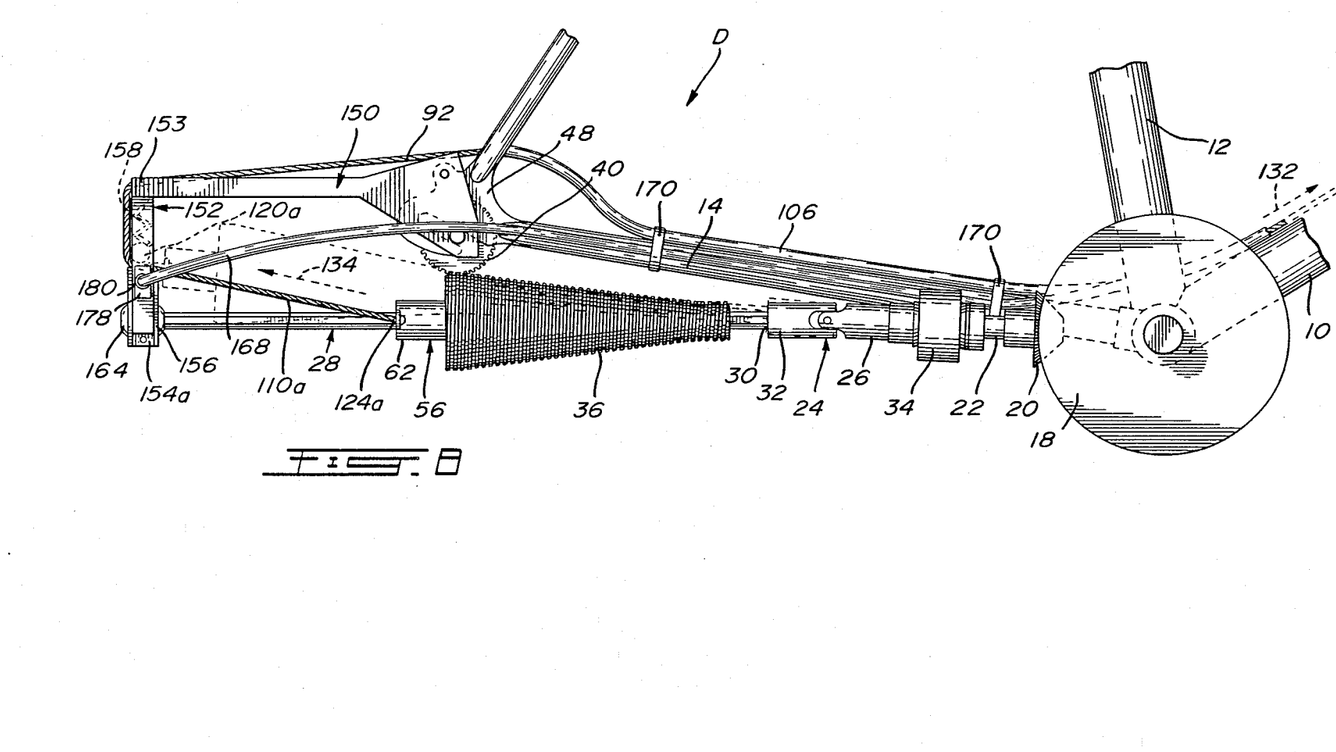
FIG. 8 a side view similar to FIG. 2 showing the drive mechanism in the second embodiment thereof.
Figure 9:
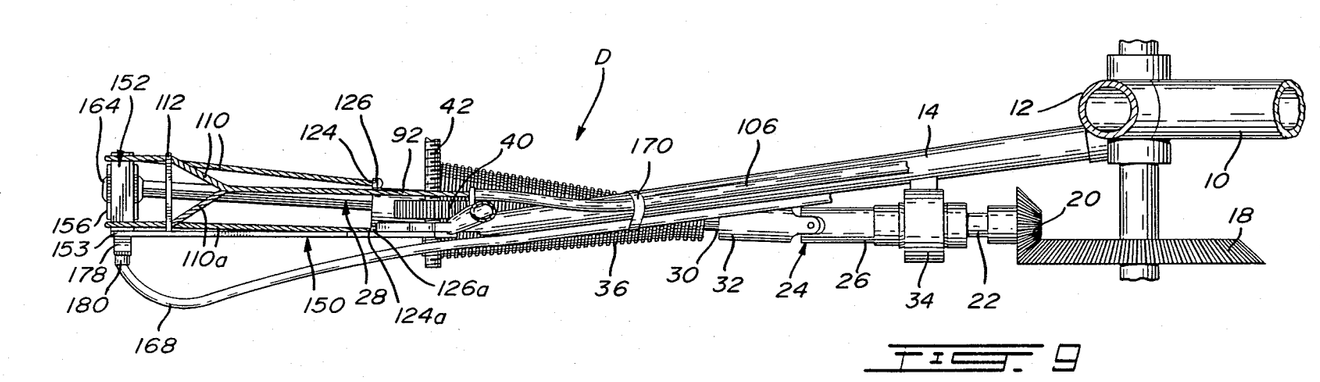
FIG. 9 is a top plan view similar to FIG. 3 showing the drive mechanism in the second embodiment thereof.
Figure 10:
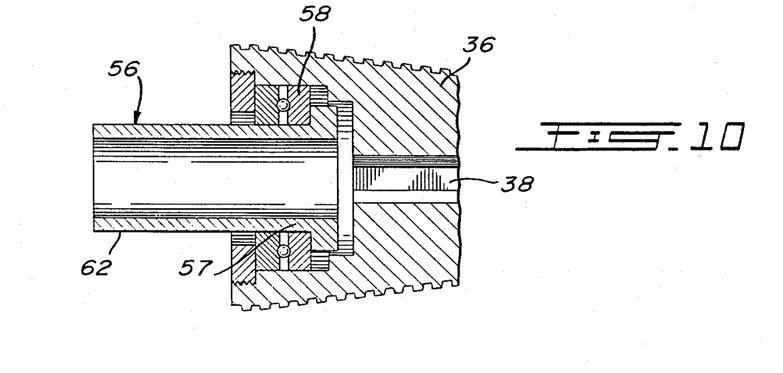
FIG. 10 is a cross-sectional side view similar to FIG. 4 showing a part of the worm gear and parts associated therewith adapted for the second embodiment of the drive mechanism.

The shifting lever 16 is pivotally mounted to the frame member 10 by way of a clamped bracket 68. The shifting lever 16 comprises a release-rod 70 which is connected at a first end 72 thereof to a first end 74 of a pawl 76 pivotally mounted at the middle thereof inside the shifting lever 16. An angular tooth 78 extends from a second end 80 of the pawl 76. The clamped bracket 68 comprises a number of adjacent notches 82 adapted to receive the angular tooth 78. As release-button 84, loaded by way of a spring 86, is second end 88 thereof. A second end 90 of the release slidably mounted within the shifting lever 16 at a rod 70 is attached to an inside wall of the release-button 84.

A steel cable 92 is attached at a first end 94 thereof to a clamp 96 which is fixedly mounted to the frame member 10. From that first end 94, the cable 92 passes through the groove of a pulley 98 rotatably mounted to the shifting lever 16. The cable 92 then passes in a pulley 100 rotatably mounted to a clamp 102 which is fixedly mounted to the frame member 10. The cable 92 then passes freely through the clamped bracket 68, moves along the frame members 10 and 14. The cable 92 covered by a sheath 106, is kept along the frame members 10 and 14 by way of clamps 104 which maintain into position the sheath 106.

The cable 92 splits at 108 into two cables 110 and 110a which go through eyes defined vertically in a member 112 supported by the guide rail 50. The 110 and 110a are then respectively guided by pulleys 114 and 114a which are rotatably mounted to a transverse shaft 116 supported by the guide arm 46 and an end part 118 of the guide rail 50. The cables 110 and 110a are then guided by pulleys 120 and 120a which are rotatably mounted to a transverse shaft 122 supported by the guide arm 46. The cables 110 and 110a are fixed at respective ends 124 and 124a thereof to respective parts 126 and 126a of the thrust sleeve 56 which extend sideways therefrom near the end 62 thereof.

Having described the structure of the drive mechanism D, the operation thereof follows hereinbelow.

Changing the gearing ratio of the drive mechanism D is accomplished by changing the position of the worm gear 36 relative to the drive gear wheel 40. For doing so, the rider of the bicycle B must firstly press the release-button 84 of the shifting lever 16 in order that it slides within the end 88 thereof and compresses the spring 86. The release-rod 70 is thus moved longitudinally within the shifting lever 16 towards the end 74 of the pawl 76, whereby, as seen in FIG. 5, the pawl 76 rotates counterclockwise thus releasing the angular tooth 78 from one of the notches 82 of the clamped bracket 68.

Figure 2:
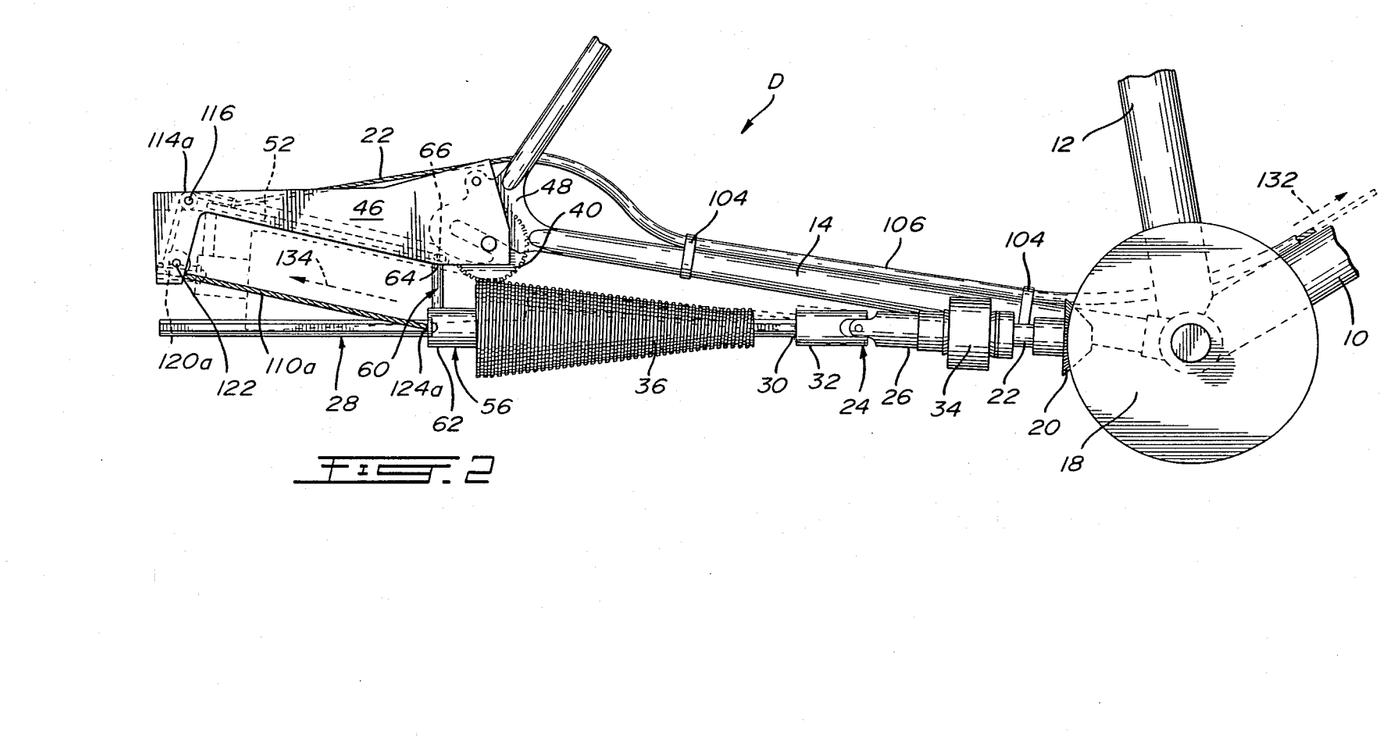
FIG. 2 is a side view of the drive mechanism showing the worm gear and other parts associated therewith in one extreme position thereof, whereas the other extreme position thereof is shown in dotted lines.
Figure 3:
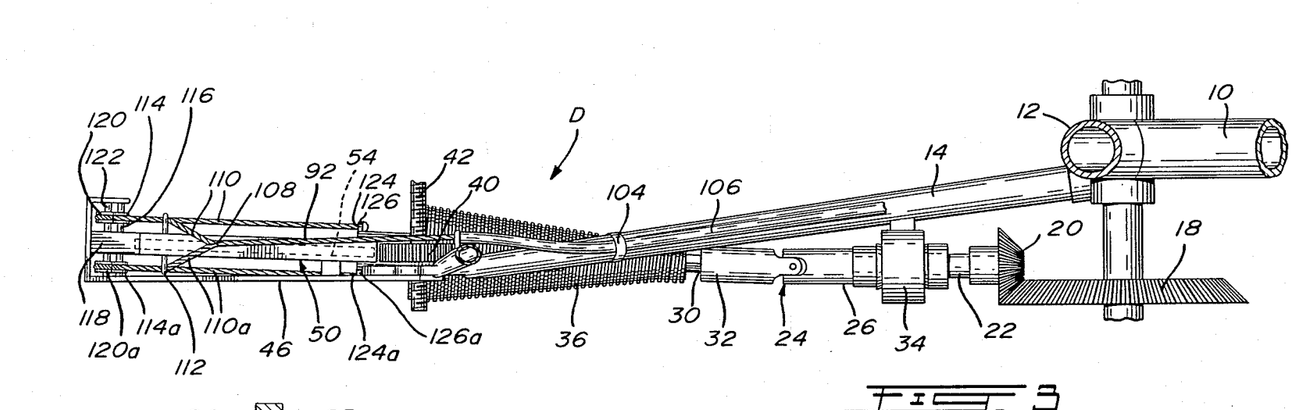
FIG. 3 is a top plan view showing the drive mechanism.

If the shifting lever 16 is pivoted so as to follow the direction of the arrow 128 shown in FIG. 5, the steel cable 92 will move up the frame member 10 as shown by the arrow 130. Referring to FIG. 2, the cable 92 slides within the clamp sheath 106 in the direction shown by the arrow 132. The duplicated cables 110 and 110a slide within the eyes of member 112 and respectively around pulleys 114 and 114a, and pulleys 120 and 120a. The direction of the movement of the cables 110 and 110a near the respective ends 124 and 124a thereof is indicated by the arrow 134. The cables 110 and 110a, acting on the thrust sleeve 56, force the worm gear 36 to move rearwardly, that is away from the end 30 of the second drive shaft 28. The thrust sleeve 56 and the worm gear 36 follow the rearward and slightly ascending movement of the guide pin 66 longitudinally within the side slots 52 as the second drive shaft 28 pivots upwardly at the universal joint 24. The upward tilting movement of the second drive shaft 28 corrects the tapering of the worm gear 36 as it moves rearwardly therealong, thus allowing the drive gear wheel 40 and the worm gear 36 to remain in a mesh.

As the rider of the bicycle B lets go of the release button 84, the latter returns to the normal extended position thereof relative to the shifting lever 16 by way of the spring 86. The end 90 of the release-rod 70 follows the movement of the release-button 84, thereby producing a clockwise rotation of the pawl 76 and the consequent locking into position of the shifting lever 16 and thus the worm gear 36 by way of the angular tooth 78 resting in one of the notches 82. The worm gear 36 therefore maintains the longitudinal position thereof relative to the second drive shaft 28 as the cables 92, 110 and 110a restrain the worm gear 36 from the natural longitudinal tendency thereof to move frontwardly towards the end 30 of the second drive shaft 28.

By pivoting the shifting lever 16 towards the frame member 10 in a direction opposite from that of the arrow 128 substantially reverses the movement of the drive mechanism D. The cables 92, 110 and 110a slacken, thus allowing the worm gear 36 to move longitudinally along the second drive shaft 28 frontwardly towards the end 30 thereof. Again, the angle of the side slots 52 in the guide rail 50 ensures a pivot of the second drive shaft 28 at the universal joint 24 and, consequently, that the worm gear 36 and the drive gear wheel 40 remain in a mesh. The shifting lever 16 is pivoted in order that enough cable is slackened for allowing a longitudinal displacement of the worm gear 36 that produces the desired gearing ratio.

It is easily seen that the first bevel gear 18, driven by a pedal mechanism P, rotatably drives, by way of the mesh thereof with the second bevel gear 20, the universal joint 24 and thus the second drive shaft 28 and the worm gear 36, the thrust bearing 58 preventing the thrust sleeve 56 to rotate therewith. The rotating movement of the worm gear 36 causes the drive wheel 40 to rotate and power the rear drive wheel 44 which propels the bicycle B frontwardly.

The notches 82 may be angularly shaped, as seen in FIG. 5, in order that depressing the release button 84 is only necessary when pivoting the handle towards the frame member 10, that is in an opposite direction than that of the arrow 128. Alternatively, the indentations 82 could be angularly shaped to provide the opposite possibility.

The pulleys 98 and 100 are provided, for duplicating the displacement of the cable 92 in order that the pivoting movement of the shifting lever is reduced for a given longitudinal displacement of the worm gear 36.

Figures 11, 12, 13:
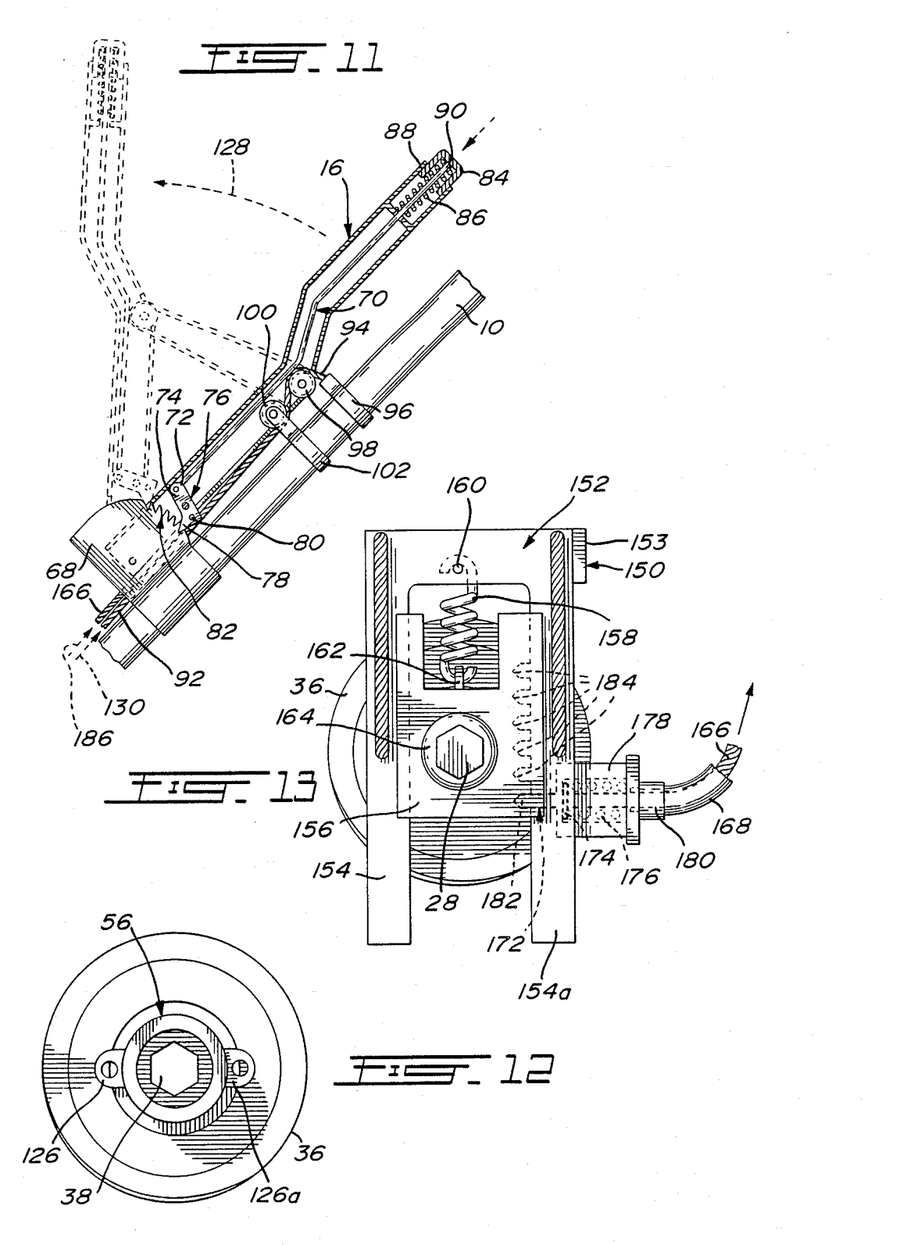
FIG. 11 is a side view partly in cross-section similar to FIG. 5 showing a shifting lever adapted for the second embodiment of the drive mechanism.
FIG. 12 is a rear elevation similar to FIG. 6 showing the end of the worm gear and parts of the drive mechanism.
FIG. 13 is a rear elevation showing the worm gear and part of the shifting guiding mechanisms adapted therefor.

In a second embodiment of the present invention, a modified shifting mechanism is presented. The mechanism for moving the worm gear 36 along the drive shaft 28 remains substantially the same using the cables 92, 110 and 110a and the overall principle of the shifting lever 16 and the parts associated therewith. The modifications lie in the guiding mechanism which comprises a guide arm 150 fixedly mounted to the frame part 48 of the bicycle B, and a guide housing 152 extending downwardly from an end 153 thereof. The guide housing 152 includes two elongated and parallel arms 154 and 154a. A height compensating part 156 is slidably mounted between the arms 154 and 154a of the guide housing 152. A tensioned spring 158 links the guide housing 152 to the height compensating part 156 by way of a pin 160 mounted to the guide housing 152 and a part 162 provided with an opening, part 162 extending from the height compensating part 156. A bushing 164, housed in the height compensating part 156, is provided with an outer spherical surface and a hexagonal opening defined therethrough adapted to slidably receive the second drive shaft 28. A cable 166 covered by a sheath 168 is fixed at a first end thereof to the second end 80 of the pawl 76 as can be seen in FIG. 11. The sheath 168 is fixedly retained to the frame members 10 and 14 by way of clamps 170. A locking pin 172 is fixedly mounted at a second end of the cable 166 as seen in FIG. 12. The locking pin 172 includes a shoulder portion 174 on which is loaded a slightly compressed spring 176 located in a housing 178 which comprises an end portion 180 adapted to receive the cable 166 and the sheath 168. An end 182 of the locking pin 172 is adapted to fit in a series of interdental spaces 184.

As the pawl 76 is caused to rotate counterclockwise clockwise, the cable 166 fixed at one end thereof to end 80 of the pawl 76 moves in a direction shown by the arrow 186, as seen in FIG. 11. Now referring to FIG. 12, the movement of the cable 166 within the sheath 168 causes the pin 172 to retract from one of the interdental spaces 184, thus compressing the spring 176 in the housing 178. The height compensating part 156 is then free to slide between the arms 154 and 154a of the guide housing 152 is a way which depends on the movement of the cables 92, 110 and 110a. Hence, the worm gear 36 is moved along the second drive shaft 28 and secured into a desired position thereof by releasing the release-button 84, thus allowing the pin 172 to take place in an appropriate one of the interdental spaces 184. Each interdental space 184 cooperates with one of the notches 82 in a cable locking position, wherein the cables 92, 110 and 110a are maintained into position as is the worm gear 36 longitudinally along the second drive shaft 28. The bushing 164 with the spherical outer surface thereof is able to rotate within the height compensating part 156, thus allowing the second drive shaft 28 to properly pivot in a vertical plane. The spring 158 maintains the worm gear 36 and the drive gear wheel 40 in a mesh. The relative movements of the worm gear 36 are similar to those described in detail hereinbefore for the first embodiment of the drive mechanism D.

A third embodiment of the present invention, which is not illustrated, would use a conventional friction device or the like in the above described first embodiment to replace the pawl and notch arrangement for providing continuous, that is not discrete, longitudinal worm gear adjustments, whereby all intermediate gear ratios are available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A multi-speed drive mechanism for a cycle-type vehicle, comprising:
   a gear train means rotatably supported by a frame of said vehicle and actuated by a pedal means, said gear train means including a shaft means and a variable ratio worm gear means slidably mounted thereon and adapted for rotation therewith, said variable ratio worm gear means meshing with a gear means mounted to a drive wheel of said vehicle;
   a gear shifting means for longitudinally moving said worm gear means along said shaft means and for maintaining said worm gear means and said gear means in a meshing engagement, whereby different gear ratios are provided.

2. A multi-speed drive mechanism for a cycle-type vehicle, comprising:

a worm gear support means rotatably supported by a frame of said vehicle for transmitting a rotational motion of a pedal means to a variable worm gear means slidably mounted on said worm gear support means and adapted for rotation therewith, said variable ratio worm gear means meshing with a gear means mounted to a drive wheel of said vehicle;

a gear shifting means for longitudinally moving said worm gear means along said worm gear support means and for maintaining said worm gear means and said gear means in a meshing engagement, whereby different gear ratios are provided.

3. A multi-speed drive mechanism for a cycle-type vehicle, comprising: a drive shaft rotatably driven by a pedal actuated gearing means and extending away therefrom, said drive shaft including a universal joint means; a first support means provided intermediate said gearing means and said universal joint means for rotatably supporting said drive shaft to a frame of said vehicle; an elongated shaft extending from said universal joint means opposite of said gearing means; a variable ratio worm gear means having an opening defined centrally and longitudinally therethrough is slidably mounted on said elongated shaft and adapted for rotation therewith, said worm gear means meshing with a drive gear means mounted to a drive wheel of said vehicle, whereby different gear ratios are provided in relation to the longitudinal position of said worm gear means on said elongated shaft; a gear shifting means for moving said worm gear means along said elongated shaft and for maintaining said worm gear means and said drive gear means in a meshing engagement.

4. A drive mechanism as defined in claim 3, wherein said worm gear means is tapered.

5. A drive mechanism as defined in claim 4, wherein said worm gear means is cone-shaped.

6. A drive mechanism as defined in claim 5, wherein the opening defined in said worm gear means and the elongated shaft associated therewith have a non-circular cross-section.

7. A drive mechanism as defined in claim 5, wherein the opening defined in said worm gear means and the elongated shaft associated therewith have a hexagon-shaped cross-section.

8. A drive mechanism as defined in claim 3, wherein said gear means comprises a first and a second bevel gear, said first bevel gear being mounted to an axle of the pedal means in a substantially parallel way relative to the drive wheel and being adapted for meshing with the second bevel gear which is transversely mounted to an end of said drive shaft.

9. A drive mechanism as defined in claim 3, wherein the first support means comprises a bearing means.

10. A drive mechanism as defined in claim 3, wherein said drive gear means comprises a ratchet-type gear mounted to an axle of said drive wheel.

11. A drive mechanism as defined in claim 3, wherein the gear shifting means comprises an adjustable handle means mounted to said frame for operating a cable means linking said handle means and said worm gear means, thereby controlling the longitudinal displacement of the worm gear means; the gear shifting means further comprising a cable guiding means and a worm gear guiding means.

12. A drive mechanism as defined in claim 11, wherein the worm gear means includes a separate sleeve means coupled therewith and restricted to longitudinal movement along the elongated shaft and which does not rotate with the elongated shaft, said cable means being attached at a first end thereof to said sleeve means for controlling by way of said adjustable handle means the longitudinal displacement of said worm gear means.

13. A drive mechanism as defined in claim 12, wherein the adjustable handle means is pivotally mounted at a first end thereof to said frame and comprises a pawl means cooperating with a number of notches defined on a fixed part of said handle means; said handle means further comprising a release means for said pawl means with respect to said notches; said cable means cooperating with said handle means, whereby a pivoting motion thereof produces a displacement of said cable means and, thus, of said worm gear means.

14. A drive mechanism as defined in claim 13, wherein a second end of said cable means is attached to the frame near the handle means, said cable means passing in a first pulley rotatably mounted in said handle means substantially away from the pivot thereof, said cable means then passing in a second pulley rotatably mounted to the frame, whereby the displacement of the cable means and thus the worm gear means is substantially duplicated with respect to that of the handle means.

15. A drive mechanism as defined in claim 14, wherein the fixed part of the handle means is clamped to said frame, said handle means pivoting at said fixed part.

16. A drive mechanism as defined in claim 15, wherein said release means of the handle means comprises a release-rod longitudinally mounted therein; said pawl means being pivotally mounted substantially at the center thereof inside said handle means, a first end of sold pawl means including a tooth means for cooperating with said notches, a first end of said release-rod being pivotally mounted to a second end of said pawl means opposite said first end thereof and a second end of said release-rod being mounted to a spring loaded release-button slidable within a second end of said handle means, whereby depressing the release-button pivots by way of the release-rod the pawl means thereby disengaging the tooth means thereof from one of said notches for allowing the handle means to be pivoted for producing a cable displacement.

17. A drive mechanism as defined in claim 16, wherein said worm gear guiding means, mounted to said frame rearwardly of said drive gear means, comprises a guide rail means and further cable guiding means, said guide rail means having at least a slot angularly defined therein (with respect to a horizontal plane) adapted to receive a guide pin means mounted to a free end of a member extending from said sleeve means, whereby a movement of the sleeve means and of the worm gear means angularly follows that of the guide pin means within the slot of the guide rail means as the elongated shaft pivots at the universal joint means for maintaining the worm gear means and the drive gear means in a meshing engagement.

18. A drive mechanism as defined in claim 16, wherein the worm gear guiding means comprises a body mounted to said frame and extending rearwardly relative to said drive of a means, said body including a further cable guiding means and a guide means for said elongated shaft, said guide means including a sliding member rearward of said worm gear means slidably mounted to said guide means by way of at least a spring means, said sliding member being slidable in a substantially vertical plane and having a bushing means adapted for receiving at least an end of the pivoting elongated shaft, a second cable means being mounted at a first end thereof to said first end of said pawl means and at a second end thereof to a first end of a spring-loaded pin means housed substantially horizontally in said guide means, a second end of the pin means being adapted for cooperating with a number of vertically spaced horizontal interdental spaces defined in said sliding member, said interdental spaces each being associated with one of said notches in said handle means for providing different gear ratios, whereby a pivot of the handle means releases by way of the second cable means the spring-loaded pin means from one of the interdental spaces, said pivot producing by way of the cable means a longitudinal displacement of the worm gear means and a pivot of the elongated shaft, said spring means urging a movement of said sliding member with respect to said guide means for maintaining said worm gear means and said drive gear means in a meshing engagement.

19. A drive mechanism as defined in claim 18, wherein said bushing means comprises a spherical outer surface.

* * * * *